United States Patent
Jung

[19]

[11] Patent Number: 5,911,377
[45] Date of Patent: Jun. 15, 1999

[54] DEVICE FOR PREVENTING THREAD-ENTANGLEMENT ON A FISHING REEL

[75] Inventor: Yong-Ju Jung, Kyunggi-do, Rep. of Korea

[73] Assignee: Wonder Co., Ltd., Pusan, Rep. of Korea

[21] Appl. No.: 08/749,780

[22] Filed: Nov. 15, 1996

[30] Foreign Application Priority Data

Mar. 14, 1996 [KR] Rep. of Korea ........................ 96-4806

[51] Int. Cl.⁶ .................................................. A01K 89/01
[52] U.S. Cl. ...................................... 242/231; 242/150 R
[58] Field of Search ................................... 242/230, 231, 242/232, 233, 150 R

[56] References Cited

U.S. PATENT DOCUMENTS

| | | | |
|---|---|---|---|
| 1,387,139 | 8/1921 | Flanagan | 242/150 |
| 2,728,534 | 12/1955 | Wallace | 242/231 |
| 2,836,375 | 5/1958 | Meulnart | 242/231 |
| 3,670,984 | 6/1972 | Lenery | 242/231 |
| 4,969,613 | 11/1990 | Kaneko | 242/231 |
| 5,149,006 | 9/1992 | Hitomi | 242/231 |
| 5,513,813 | 5/1996 | Bernard et al. | 242/231 |

*Primary Examiner*—Katherine Matecki
*Attorney, Agent, or Firm*—Rabin & Champagne, P.C.

[57] ABSTRACT

A device for preventing entanglement of fishing-thread on a fishing reel includes a holder, and a line-roller having a retainer attached to an end thereof. The line-roller is provided within the holder. The line-roller is rotatable relative to the holder. A line-collar is concentrically disposed relative to the line-roller and surrounds the line-roller. The line-collar is axially movable to a position in which the line-roller and the line-collar form a space therebetween. A spring is concentrically provided between the line-roller and the line-collar. The spring has one end abutting against the retainer, and another end urging the line-collar out of the position, so that the fishing-thread is retainable in the space and between the line-roller and the line-collar.

5 Claims, 3 Drawing Sheets

DEVICE FOR PREVENTING THREAD-ENTANGLEMENT ON A FISHING REEL

TECHNICAL FIELD

The present invention relates to a device for preventing fishing-thread entanglement on a fishing reel. More particularly, the present invention relates to a fishing reel which prevents a fisherman from entangling the fishing-thread on his fishing reel.

BACKGROUND OF THE INVENTION

When using a fishing reel, the fishing-thread can stick to the fishing reel, causing the fishing-thread to become entangled. If this occurs, the fisherman must abandon the entangled thread and wind new thread onto the fishing reel.

However, abandoning the entangled thread presents two problems: the thread is wasted, and fishing is halted while the new thread is wound on the reel.

A goal of the present invention is to provide a device which prevents the fishing-thread from becoming entangled on the fishing reel. Thus, thread is not wasted, and fishing is not halted while new thread is wound onto the fishing reel.

SUMMARY OF THE INVENTION

To accomplish the goal, the invention is characterized by a fishing reel which includes a holder; a line-collar provided at an inner part of the holder; a spring having an elastic force provided on an inner part of the line-collar; a line-roller having a hollow part at a tip thereof; and a retainer, provided in the hollow part of the line-roller, to hold the spring in place.

DESCRIPTION OF AN EXEMPLARY EMBODIMENT

A detailed description of an exemplary embodiment of the present invention appears hereunder with reference to the drawings.

Figure 1:
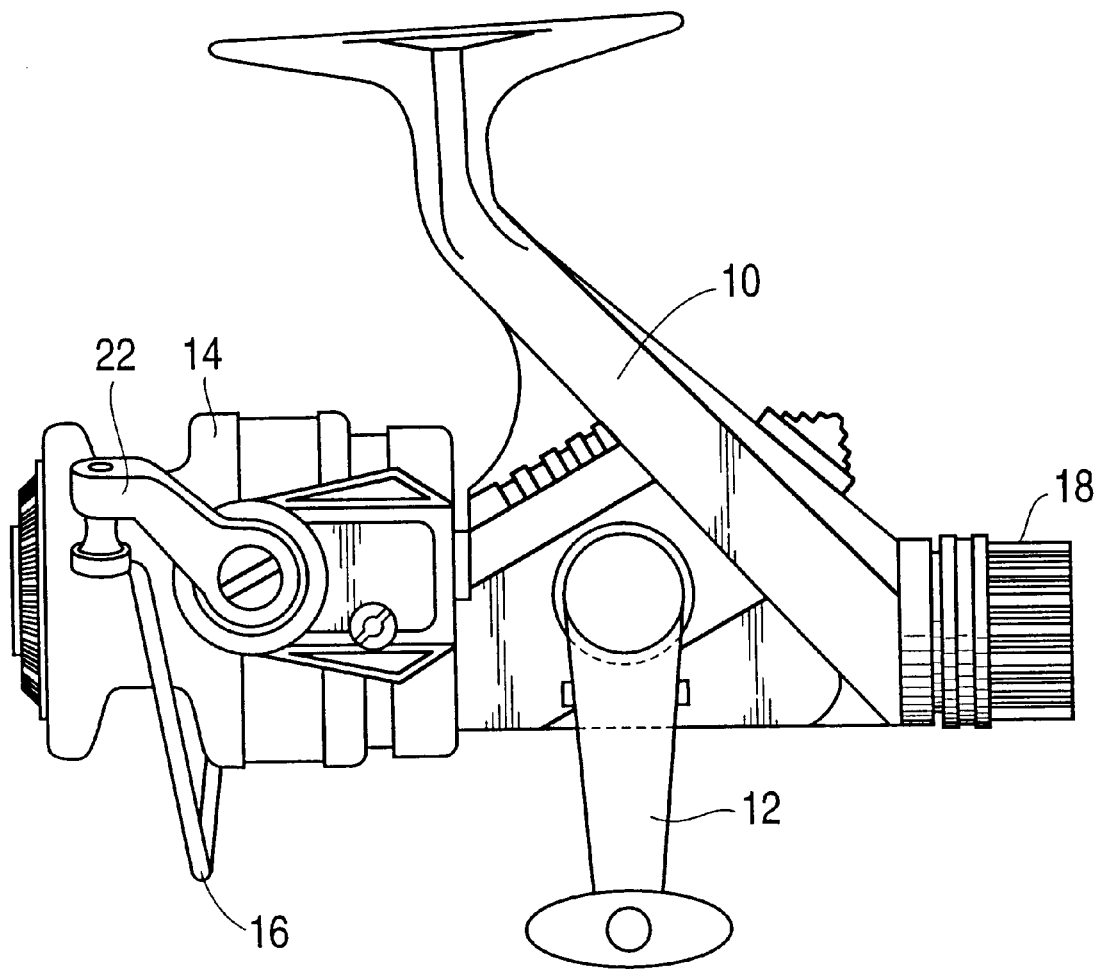
FIG. 1 is an assembly view of a fishing reel.

As shown in FIG. 1, the fishing reel includes a body 10; a rotating handle 12 fixed to the body 10; and a spinning spool 14 provided at a tip of the body 10. The fishing reel further includes a bail 16 provided at a front tip of the spool 14. The bail 16 guides the thread when winding or releasing it, and converts the direction of the thread up and down. The fishing reel additionally includes a dragknob 18 provided at a rear tip of the spool 14. The dragknob 18 rotates with the rotation of spool 14.

Figure 2:
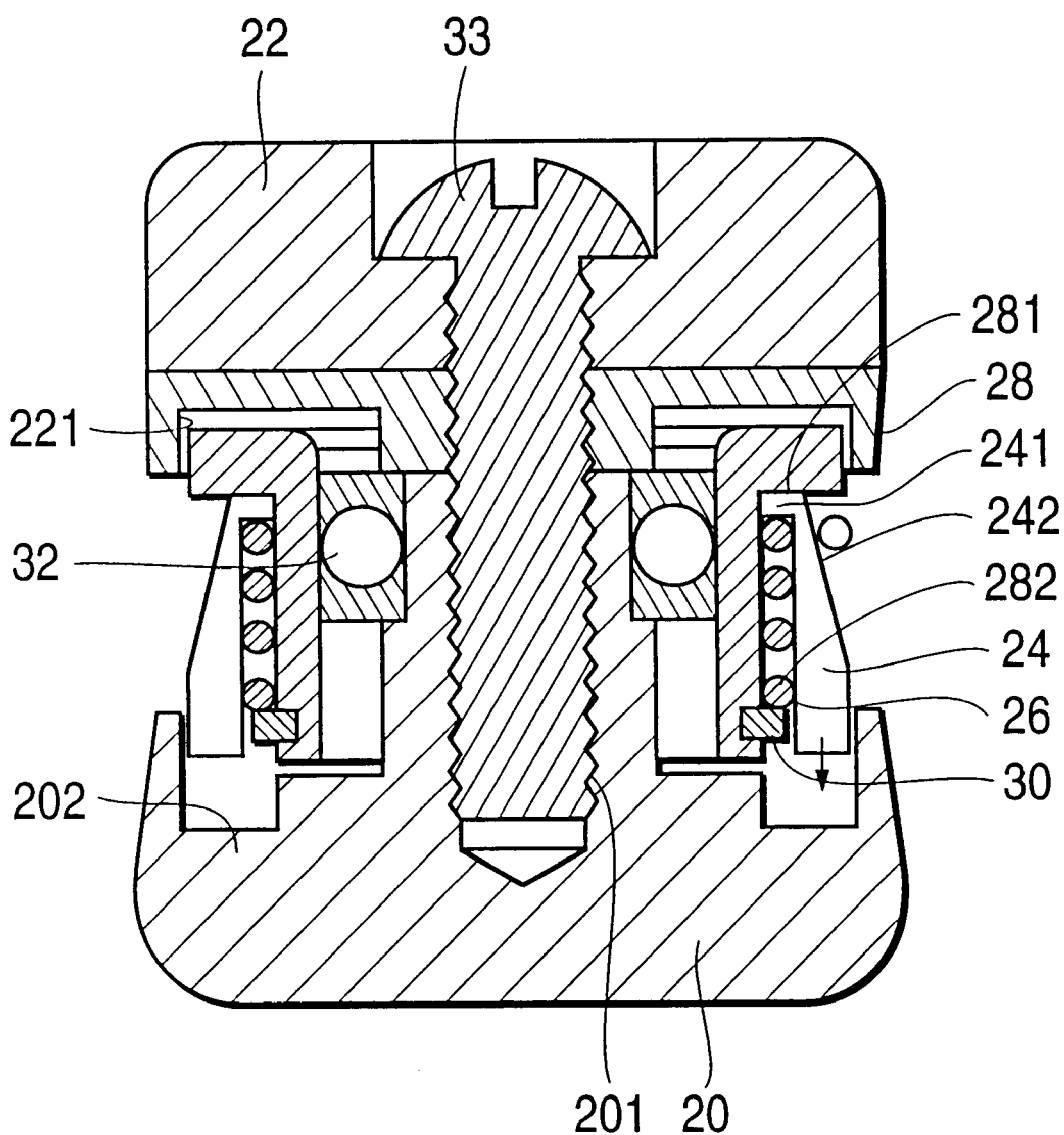
FIG. 2 is a cross-sectional view of a line-collar and its surrounding components.

As shown in FIG. 2, a holder 20 is connected to a tip of the bail 16. A bail arm 22 is fixed to holder 20, using a screw 33 threaded into a screw body 201 formed in a inner portion of the holder 20. A line-collar 24 is disposed in a hollow part 202 formed in the holder 20. As shown, the line-collar 24 is positioned co-axial to the screw 33. A spring 26 is provided adjacent to an inner surface of the line-collar 24, so that the spring 26 and the line-collar 24 are concentric. The spring 26 exerts an elastic force against the line-collar 24, as will be subsequently described.

The upper tip of the line-collar 24 is provided with a raised portion 241, which projects toward the screw 33. The upper end of spring 26 abuts against raised portion 241, so that the spring 26 will exert a spring force against line-collar 24 in a direction parallel to an axis of screw 33. An upper, outer region of the line-collar 24 is provided with a slanted surface 242. Slanted surface 242 tapers toward the raised portion 241, and is formed to facilitate the sliding of the fishing-thread.

A line-roller 28 is provided within the spring 26, so that the line-roller 28, spring 26 and line-collar 24 are all concentrically arranged, with the spring 26 being disposed between the line-roller 28 and the line-collar 24. Further, the bail arm 22 is provided with a hollow region 221, and the line-roller 28 is provided with a protruding arm 281. Protruding arm 281 projects away from the screw 33, i.e. in a direction opposite to raised portion 241. Protruding arm 281 is received within the hollow region 221 of the bail arm 22. Line-roller 28 is further provided with a hollow part 282, which receives a retainer 30. Retainer 30 projects in the same direction as protruding arm 281. Retainer 30 abuts against the bottom end of spring 26, so that the spring is held between the retainer 30 and the raised portion 241.

A bearing 32 is provided between the holder 20 and the line-roller 28, at essentially the same level as the raised portion 241. Bearing 32 allows the line-roller 28 to rotate.

The operation and effect of the present invention are as follows:

When a fisherman holds body 10 with one hand, and turns handle 12 with the other hand, the thread wound on spool 14 is guided to the slanted surface 242 of the line-collar 24. Then, the tension in the thread causes the thread to move down the slanted surface 242 of the line-collar 24.

Figure 3:
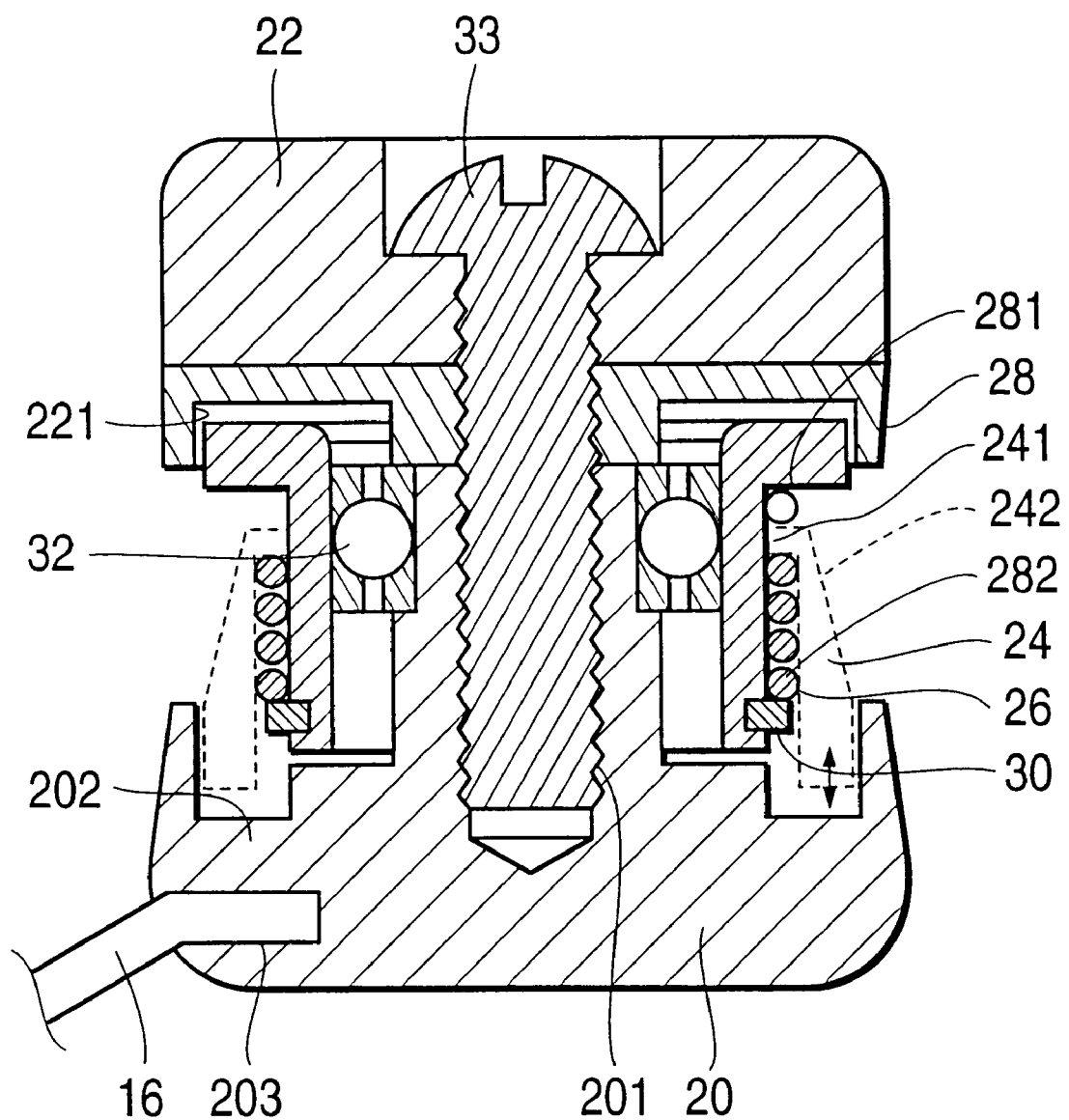
FIG. 3 is a cross-sectional view of the line-collar illustrated in FIG. 2, but moved due to the tension of fishing-thread.

If the tension of the thread is greater than the spring force of spring 26, the spring 26 will be compressed between retainer 30 and raised portion 241. As a result, the line-collar 24 will move in a direction parallel to the axis of screw 33, and in a direction away from protruding arm 281, i.e., to the position shown in dashed lines in FIG. 3. As shown, this will cause a space to be formed between the line-collar 24 and the line-roller 28, so that the thread will slide down the slanted surface 242 and into the space.

The thread disposed within the space will be compressed (and thus held) by the line-roller 28 and the line-collar 24, which are being urged together by the force of the spring 26. As a result, the thread tension occurring when winding or releasing the thread will compress the spring, causing the thread to enter the space and be held due to the force of the spring, thus preventing entanglement of the thread.

Thus, the present invention provides a solution for preventing thread entanglement of a fishing reel by applying a tension force to the fishing-thread, using the elastic force of the spring to hold the thread between the line-collar 24 and the line-roller 28.

I claim:

1. A device for preventing entanglement of fishing-thread on a fishing reel, comprising:

a holder;

a line-roller having a retainer attached to an end thereof, and being provided within said holder, said line-roller being rotatable relative to said holder;

a line-collar concentrically disposed relative to said line-roller and surrounding said line-roller, and being axially movable to a position in which said line-roller and said line-collar form a space therebetween; and a spring concentrically provided between said line-roller and said line-collar, and having one end abutting against said retainer, and another end urging said line-collar out of the position, so that the fishing-thread is retainable in the space and between said line-roller and said line-collar.

2. The device recited in claim 1, wherein said line-collar has an upper region having:

a raised portion projecting toward said line-roller and having the another end of said spring abutting thereagainst, and a slanted surface tapering in a direction toward said raised portion, whereby a tension of the fishing thread causes the fishing thread to move said line-collar into the position and slide down the slanted surface into the space.

3. The device of claim 1, wherein said line-roller is positioned inside of said spring, and said line-collar is positioned outside of said spring.

4. The device of claim 3, further comprising a bail arm having a hollow region, wherein said line-roller includes an arm projecting above said line-collar and being receivable within the hollow region, said arm and said line-collar forming the space therebetween.

5. The device of claim 1, further comprising a bearing having said line-roller rotatably mounted thereon.

\* \* \* \* \*